United States Patent
Zogg et al.

(10) Patent No.: US 11,255,541 B2
(45) Date of Patent: Feb. 22, 2022

(54) JOINT SEAL SYSTEM AND METHOD

(71) Applicant: The Schebler Co., Bettendorf, IA (US)

(72) Inventors: Bradley Zogg, Bettendorf, IA (US); David Bruggeman, Matherville, IL (US); Al Landwher, Sheffield, IL (US); Jason Heinz, Davenport, IA (US)

(73) Assignee: The Schebler Co., Bettendorf, IA (US)

( * ) Notice: Subject to any disclaimer, the term of this patent is extended or adjusted under 35 U.S.C. 154(b) by 220 days.

(21) Appl. No.: 16/268,228

(22) Filed: Feb. 5, 2019

(65) Prior Publication Data

US 2019/0170350 A1    Jun. 6, 2019

Related U.S. Application Data

(63) Continuation-in-part of application No. 15/359,045, filed on Nov. 22, 2016, now Pat. No. 10,731,781.

(Continued)

(51) Int. Cl.

| | | |
|---|---|---|
| *F16L 23/032* | (2006.01) | |
| *F16L 23/12* | (2006.01) | |
| *F16L 23/16* | (2006.01) | |
| *F16L 27/12* | (2006.01) | |
| *F23J 13/04* | (2006.01) | |
| *F16L 23/08* | (2006.01) | |
| *F16L 23/10* | (2006.01) | |
| *F16L 23/20* | (2006.01) | |
| *F23J 13/02* | (2006.01) | |

(52) U.S. Cl.
CPC ............ *F23J 13/04* (2013.01); *F16L 23/032* (2013.01); *F16L 23/08* (2013.01); *F16L 23/10* (2013.01); *F16L 23/12* (2013.01); *F16L 23/162* (2013.01); *F16L 23/20* (2013.01); *F16L 27/12* (2013.01); *F23J 13/02* (2013.01); *F23J 13/025* (2013.01); *F23J 2213/202* (2013.01); *F23J 2213/204* (2013.01); *Y10T 29/53* (2015.01)

(58) Field of Classification Search
CPC ... B29C 65/48; B29C 65/4805; B29C 65/483; B29C 65/4835; B29C 65/485; F16L 23/032; F16L 23/04; F16L 23/08; F16L 23/10; F16L 23/12; F16L 23/16; F16L 23/162; F16L 23/18; F16L 23/20; F16L 23/22; F16L 27/12; F16L 27/127; F16L 27/1274; F16L 39/005; F16L 39/04; F23J 13/02; F23J 13/025; F23J 13/04; F23J 2213/20; F23J 2213/202; F23J 2213/204; Y10T 29/53; F24F 13/0209
See application file for complete search history.

(56) References Cited

U.S. PATENT DOCUMENTS

| | | |
|---|---|---|
| 390,438 A | 10/1888 | Bradbeer |
| 490,579 A | 1/1893 | Miller |

(Continued)

*Primary Examiner* — Michael A Tolin
(74) *Attorney, Agent, or Firm* — Hamilton IP Law, PC; Jay R. Hamilton; Charles A. Damschen

(57) ABSTRACT

A joint seal system and method may include a seal and a band. The seal may be positioned between abutting flanges of two adjacent duct sections. A band may be positioned over the two flanges and the flange interface. The joint seal system and method may be configured to mitigate and/or eliminate leakage of pressure, flue gases, condensate, and/or any other fluid, gas, and/or vapor between abutting flanges of duct sections at a flange interface.

8 Claims, 14 Drawing Sheets

Related U.S. Application Data

(60) Provisional application No. 62/626,605, filed on Feb. 5, 2018, provisional application No. 62/258,511, filed on Nov. 22, 2015.

(56) References Cited

U.S. PATENT DOCUMENTS

| | | |
|---|---|---|
| 499,854 A | 6/1893 | Schaffer |
| 525,467 A | 9/1894 | McMillin |
| 583,819 A | 6/1897 | Rome |
| 629,095 A | 7/1899 | Stearns |
| 696,059 A | 3/1902 | Line |
| 724,210 A | 3/1903 | Scherer |
| 1,593,256 A | 7/1926 | Harms |
| 1,652,827 A | 12/1927 | Holub |
| 1,890,930 A | 4/1929 | Blackmore |
| 2,588,496 A | 3/1952 | Dollinger |
| 2,910,311 A | 10/1959 | Carr |
| 2,963,783 A | 12/1960 | Preston |
| 2,978,262 A | 4/1961 | Epstein |
| 3,016,227 A | 1/1962 | Frederick et al. |
| 3,631,789 A | 1/1972 | Kinsey |
| 3,872,780 A | 3/1975 | Zanias |
| 3,902,744 A | 9/1975 | Stone |
| 4,029,344 A | 6/1977 | Stone |
| 4,160,559 A | 7/1979 | Nickels |
| 4,182,378 A | 1/1980 | Dieter |
| 4,724,750 A | 2/1988 | Coleman et al. |
| 4,929,000 A | 5/1990 | Annestedt |
| 5,082,297 A * | 1/1992 | Flasher ............... F16J 15/022 277/608 |
| 5,129,690 A | 7/1992 | Meinig et al. |
| 5,135,270 A | 8/1992 | Arnoldt et al. |
| 5,878,786 A | 3/1999 | Elder |
| 5,909,904 A | 6/1999 | Shea |
| 6,109,665 A | 8/2000 | Meinig |
| 6,505,864 B1 | 1/2003 | Shuey |
| 7,216,898 B1 | 5/2007 | Hermanson |
| 7,712,787 B2 | 5/2010 | Vincenti |
| 2002/0067950 A1 | 6/2002 | Price et al. |
| 2002/0094233 A1 | 7/2002 | Price et al. |
| 2002/0124614 A1 | 9/2002 | Hermanson |
| 2002/0139160 A1 | 10/2002 | Price et al. |
| 2002/0140151 A1 | 10/2002 | Couturier |
| 2003/0006611 A1 | 1/2003 | Shuey |
| 2007/0090647 A1 | 4/2007 | Vincenti |
| 2007/0257487 A1 | 11/2007 | Jacklich et al. |
| 2015/0260426 A1* | 9/2015 | Hermanson ......... F24F 13/0209 285/336 |
| 2017/0074436 A1* | 3/2017 | Zogg ..................... F16L 23/12 |

* cited by examiner

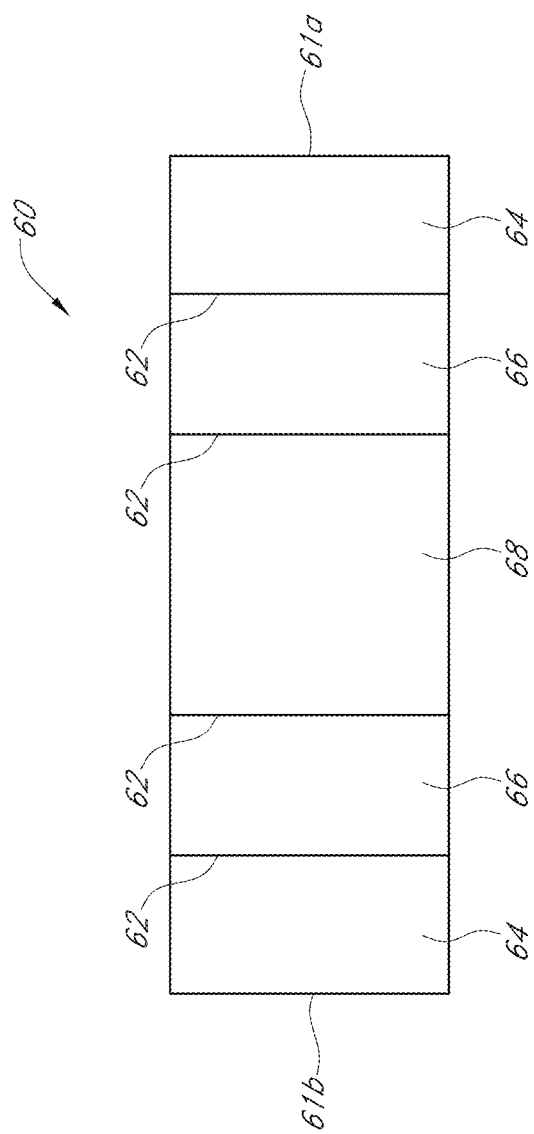

JOINT SEAL SYSTEM AND METHOD

CROSS REFERENCE TO RELATED APPLICATIONS

This non-provisional utility patent application is a continuation-in-part of and claims priority from U.S. patent application Ser. No. 15/359,045 filed on Nov. 22, 2016, now U.S. Pat. No. 10,731,781, which application claimed priority from provisional U.S. Pat. App. No. 62/258,511 filed on Nov. 22, 2015. Applicant states that this non-provisional patent application also claims priority from provisional U.S. Pat. App. No. 62/626,605 filed on Feb. 5, 2018. All of the preceding applications are incorporated by reference herein in their entireties.

FIELD OF INVENTION

The present invention relates to duct work for handling various types of gases. More particularly, the present invention is especially useful in providing an air-tight joint between two duct sections.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Double-walled chimneys are known in the art, one example of which is disclosed in the U.S. Pat. No. 3,902,744 to Stone and prior art cited therein. The basic construction involves inner and outer concentric pipes affording an annular insulating space between them. Fundamentally, the assembly or erection of the chimney proceeds with coaxial, end-to-end stacking of, say, a pair of inner pipes, the meeting ends of which are radially outwardly flanged to receive an inner annular ring which clamps the pipes together.

Another example of a double-walled chimney is disclosed in U.S. Pat. No. 4,724,750, which is incorporated by reference herein. These and other prior art references show that it is known in the art to fabricate corresponding flanges on two adjacent sections at the interface thereof. The flanges are typically transverse to the basic axis of the chimney section. Typically an annular ring is placed over the junction of the two corresponding flanges to better seal the chimney.

Although these flanged chimney sections are well known when the cross-sectional shape of the chimney is circular or angular (such as rectangular, square, etc.), the prior art does not disclose a flanged chimney section or corresponding connection system for chimneys with a cross-sectional area that is rounded but non-circular. One such rounded but non-circular shape is often referred to as "obround." As used herein, "obround" is defined as a shape consisting of two semicircles connected by parallel lines tangent to their endpoints.

BRIEF DESCRIPTION OF THE FIGURES

The accompanying drawings, which are incorporated in and constitute a part of this specification, illustrate embodiments and together with the description, serve to explain the principles of the methods and systems.

FIG. 8 is an elevated view of a sheet of material showing the creases for one embodiment of a chimney section.

DETAILED DESCRIPTION—LISTING OF ELEMENTS

Figure 1:
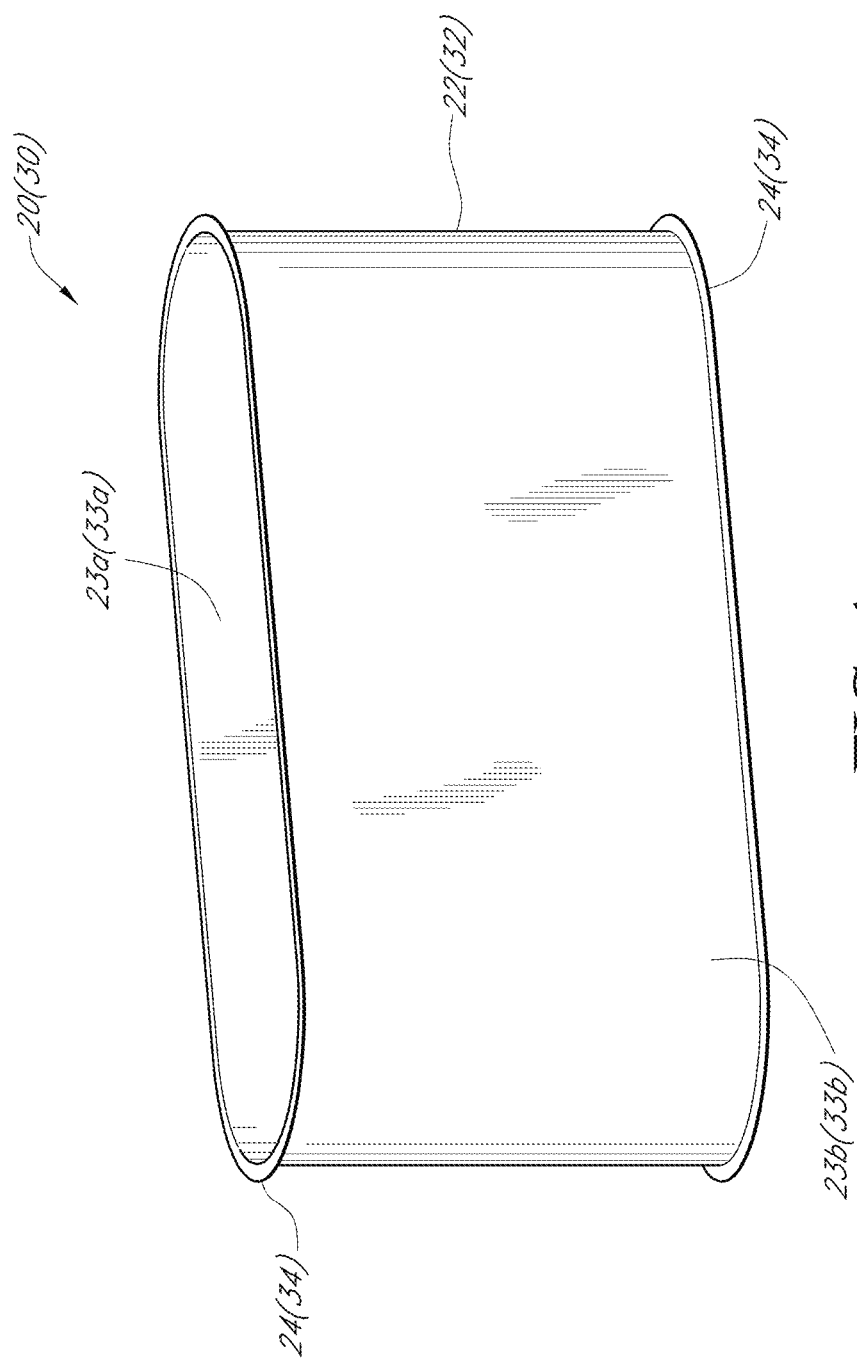
FIG. 1 is a perspective view of one chimney section of a first embodiment.

| ELEMENT DESCRIPTION | ELEMENT # |
|---|---|
| Chimney system | 10 |
| Gasket | 12 |
| First section | 20 |
| First section body | 22 |
| First section body interior | 23a |
| First section body exterior | 23b |
| First section flange | 24 |
| Second section | 30 |
| Second section body | 32 |
| Second section body interior | 33a |

| ELEMENT DESCRIPTION | ELEMENT # |
|---|---|
| Second section body exterior | 33b |
| Second section flange | 34 |
| Flange interface | 36 |
| V-band | 40 |
| First flat portion | 42a |
| Second flat portion | 42b |
| First angled portion | 44a |
| Second angled portion | 44b |
| V-band apex | 46 |
| V-band clamp | 48 |
| Insulated chimney system | 50 |
| Insulated chimney section | 51 |
| Starter section | 51' |
| Starter section collar | 51a' |
| Insulation | 52 |
| Spacer clip | 53 |
| Spacer clip inner tab | 53a |
| Spacer clip outer tab | 53b |
| Inner shell | 55 |
| Inner shell flange | 55a |
| Aperture | 55a' |
| Outer shell | 56 |
| Outer shell channel | 56a |
| Outer band | 57 |
| Sheet | 60 |
| Sheet right edge | 61a |
| Sheet left edge | 61b |
| Crease | 62 |
| Outer section | 64 |
| Inner section | 66 |
| Middle section | 68 |
| Band | 110 |
| Hinge | 112 |
| Connector | 114 |
| Anchor | 116 |
| Slot | 116a |
| Angled portion | 117 |
| Vertex | 117a |
| Flat portion | 118 |
| Seal | 120 |
| Exterior band | 130 |
| Intermediate section | 140 |
| Fixed flange | 142 |
| Free end | 143 |
| Slip collar | 144 |
| Slip collar flange | 144a |

DETAILED DESCRIPTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

Before the various aspects of the present disclosure are explained in detail, it is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

Referring now to the drawings, wherein like reference numerals designate identical or corresponding parts throughout the several views, FIG. 1 illustrates various aspects of a first section 20 of the chimney system 10. The chimney system 10 as disclosed herein may comprise any number of sections 20, 30, but for clarity only two sections 20, 30 (a first section 20 and a second section 30) are discussed and pictured herein. However, the scope of the present disclosure is not so limited unless indicated in the following claims.

Figure 4:
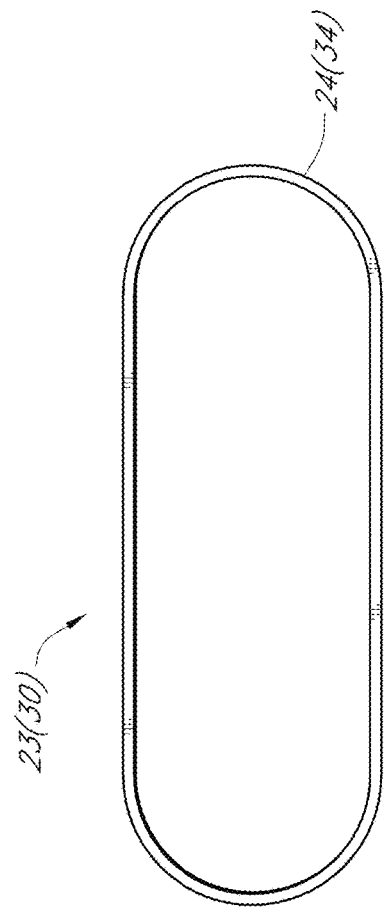
FIG. 4 is an end view of a chimney section of the first embodiment wherein the cross-sectional shape of the chimney section is obround.

The sections 20, 30 may be obround in shape, which is best shown at least in FIGS. 1 and 4, the latter of which is an end view of a section 20, 30. Each section 20, 30 may include a section body 22, 32. The inner surface of the first section body 22 may be comprised of a first section body interior 23a, and the exterior surface may be comprised of a first section body exterior 23b. Correspondingly, the inner surface of the second section body 32 may be comprised of a second section body interior 33a, and the exterior surface may be comprised of a second section body exterior 33b. Generally, the fluid routed through the chimney system 10 may pass through the portion of space bounded by the section body interiors 23a, 33a.

Referring still to FIG. 1, the first section 20 may include a first section flange 24 on each end of the first section body 22. Each first section flange 24 may be generally perpendicular to the main longitudinal axis of the first section body 22. Each first section flange 24 may be integrally formed with the first section body 22. In this manner, the entire first section 20 may be formed from one piece of material. The specific dimensions of the first section flange 24 and the orientation thereof with respect to the first section body 22 may vary depending on the specific application for the chimney system 10, and is therefore in no way limiting to the scope of the present disclosure unless so indicated in the following claims. In some applications, it is envisioned that the first section flange 24 may be be oriented exactly ninety degrees from the first section body exterior 23b, such that the first section body 22 and the first section flange 24 form a right angle between them, and that the first section flange 24 extend one-half inch from the first section body exterior 23b. The precise angle between the first section flange 24 and first section body exterior 23b will be greater or less than ninety degrees in other aspects of the chimney system 10 without departing from the spirit and scope of the chimney system 10 unless so limited in the following claims. Furthermore, the first section flange 24 may extend from the first section body exterior 23b by an amount greater or less than one-half inch, and is therefore in no way limiting in scope of the present disclosure unless so indicated in the following claims.

Figure 2:
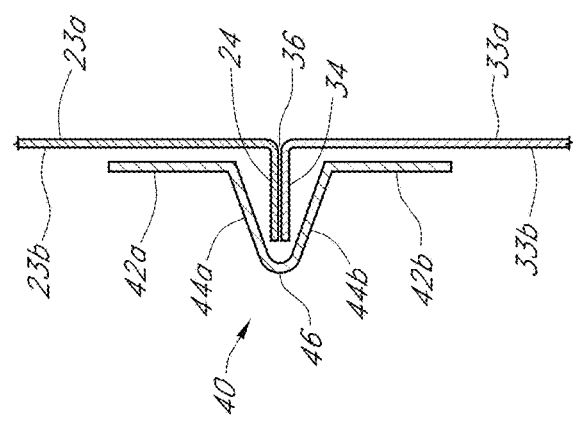
FIG. 2 is a detailed, cross-sectional view of the junction of two adjacent chimney sections according to the first embodiment.

Various aspects of a junction between the first section 20 and the second section 30 is shown in detail in FIG. 2. The cross-sectional view of this junction as shown in FIG. 2 shows the first section flange 24 abutted with the second section flange 34 to form a flange interface 36. Although not shown in FIG. 2, a sealant (not shown) may be placed at the flange interface 36. In one aspect, first section flange 24 may be perpendicular to the first section body 22 and the second section flange 34 may be perpendicular to the second section body 32 as previously described above. Furthermore, the first section body 22 may be parallel to the second section body 32, and the first section flange 24 may be parallel to the second section flange 34. Because the first and second section flanges 24, 34 may be parallel to one another, the flange interface 36 may include nearly the entire surface area of both the first and second section flanges 24, 34. In many applications this configuration may provide a better seal at the flange interface 36.

In an aspect, a V-band 40 may be placed over the flange interface 36. A V-band 40, as shown in FIG. 2, may include a first flat portion 42a that may abut the first section body exterior 23b and a corresponding second flat portion 42b that may abut the second section body exterior 33b. To ensure the clearance between the respective flat portions 42a, 42b and section body exteriors 23b, 33b is optimal, the V-band 40 may include a V-band clamp 48 for adjusting the tension of the V-band clamp 48. As shown herein, the V-band clamp 48 may be configured as a typical bolt-and-receiver clamp with two bolts. However, the V-band clamp 48 may employ any structure or method suitable for adjusting the tension of banding structures around the exterior of a section 20, 30 without departing from the scope of the present invention unless so indicated in the following claims. The first flat portion 42a may be connected to the first angled portion 44a and the second flat portion 42b may be connected to the second angled portion 44b. The first angled portion 44a and the second angled portion 44b may be connected by the V-band apex 46. The relative angles and orientations between and among the first flat portion 42a, second flat portion 42b, first angled portion 44a, second angled portion 44b, and V-band apex 46 may be different than those show here in other embodiments without departing from the spirit and scope of the present disclosure unless so indicated in the following claims.

Figure 3:
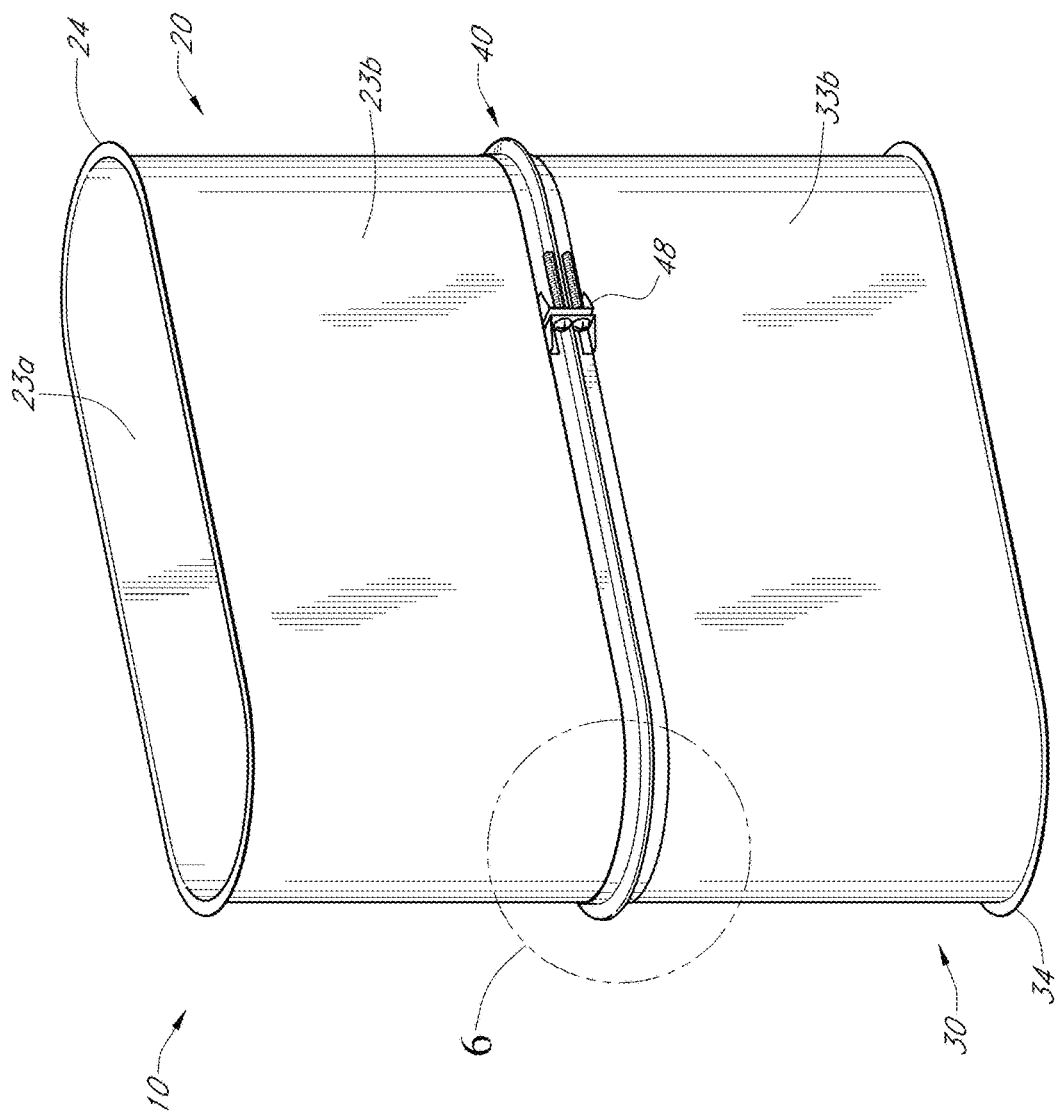
FIG. 3 is a perspective view of two chimney sections of the first embodiment joined to one another with a V-band.
Figure 6:
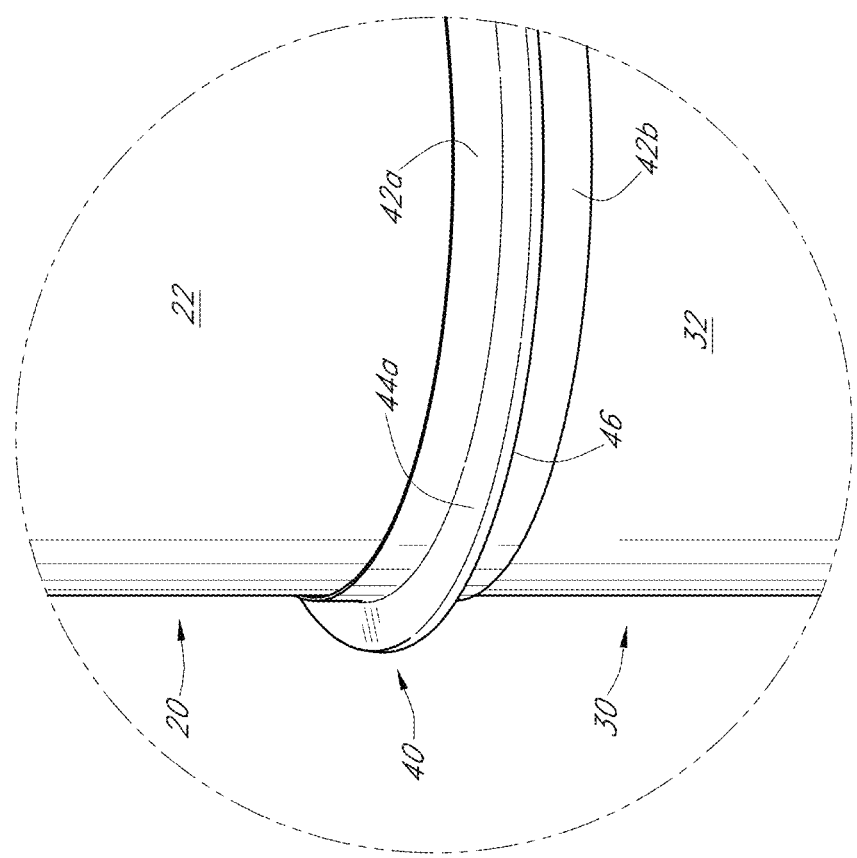
FIG. 6 is a detailed view of the exterior of the chimney at the junction of two sections with a V-band applied thereto.

Again, although not shown in FIG. 2, sealant (not shown) may be positioned between the flange interface 36 and any portion of the V-band 40, and/or between the first section body exterior 23b, second section body exterior 33b and the first flat portion 42a or second flat portion 42b. The sealant (not shown) placed in any of the areas listed above may be used to hermetically seal the flange interface 36 and/or the junction of the first and second sections 20, 30. The sealant (not shown) used in any aspect or application of either the chimney system 10 or insulated chimney system 50 (described in detail below) may be any type of sealant (not shown) known to those skilled in the art or later developed that is appropriate for the particular application, whether silicon-based, Teflon-based, or otherwise. For example, S600 or S2000 may be used as a sealant (not shown) to enhance the gas impermeable seal, which may be rated or used with a range of pressures including negative, neutral, or positive pressures greater than one atmosphere (1 ATM). As those of ordinary skill in the art will appreciate, although not shown in the various figures herein, the chimney system 10 and insulated chimney system 50 also may have an insulating material positioned between the V-band 40 and flange interface 36. The junction between a first section 20 and second section 30 is shown in perspective in FIG. 3, and FIG. 6 shows the junction of the first and second section 20, 30 with the V-band 40 applied thereto in greater detail.

Figure 5:
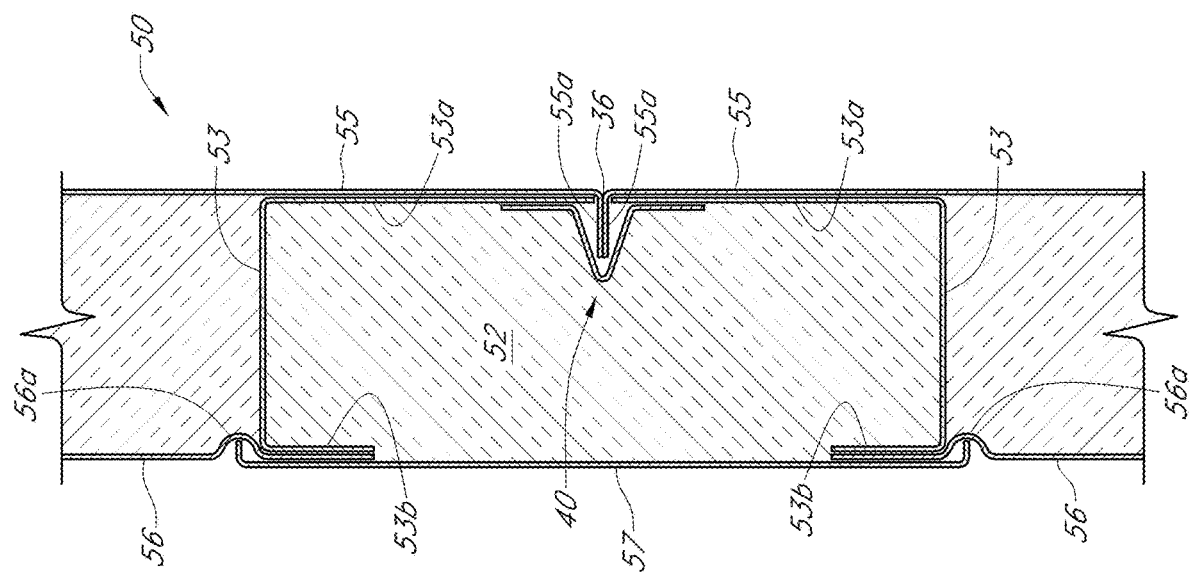
FIG. 5 is a detailed, cross-sectional view of the junction of two adjacent chimney sections according to the second embodiment, wherein the chimney system is insulated.

Additional aspects of a chimney system 10 are shown FIG. 5, which provides a cross-sectional view of two insulated chimney sections 51 at a flange interface 36. The flange interface 36 shown in FIG. 5 may be between two adjacent insulated chimney sections 51, which insulated chimney sections 50 may be configured in a manner similar to those shown in FIG. 7. One or more insulated chimney section 51 in cooperation with another fluid conduit may constitute an insulated chimney system 50. In one aspect, an insulated chimney system 50 may include a plurality of insulated chimney sections 51. The inner shell 55 of an insulated chimney section 51 may be substantially the same as the sections 20, 30 of the chimney system 10 described in detail above. Accordingly, the flange interface 36 between the two adjacent inner shells 55 of the insulated chimney system 50 shown in FIG. 5 may be substantially the same as the flange interface 36 between the first section 20 and the second section 30 shown in FIG. 1.

In the insulated chimney system 50 each inner shell 55 and an outer shell 56 may be substantially the same shape for a given insulated chimney section 51, although the periphery of the outer shell 56 generally will be greater than that of the inner shell 55. As previously mentioned, each inner shell 55 of the insulated chimney system 50 may be substantially the same as each section 20, 30 of the chimney system 10 described in detail above in that an inner shell flange 55a may be integrally formed with the inner shell 55 on at least one end of each inner shell 55. Accordingly, the junction between two adjacent insulated chimney sections 51 at their respective inner shells 55 may form a flange interface 36 substantially similar in structure and function to that described in detail above for the chimney system 10. As described for the flange interface 36 in the chimney system 10, a V-band 40 may be used to secure one inner shell 55 to an adjacent inner shell 55, but the scope of the present disclosure is not so limited unless indicated in the following claims.

In the insulated chimney system 50, a predetermined amount of insulation 52 may be positioned between the inner shell 55 and the outer shell 56. The distance between the inner shell 55 and outer shell 56 may be determined by the length of the spacer clips 53, which spacer clips 53 may extend from the inner shell 55 to the outer shell 56. The spacer clips 53 and insulation 52 may be configured so that an air gap (not shown) remains between the insulation 52 and the outer shell 56 if desired. In another aspect, each spacer clip 53 may include a spacer clip inner tab 53a and spacer clip outer tab 53b. The spacer clip inner tab 53a may be placed between one of the flat portions 42a, 42b of the V-band 40, as shown in FIG. 5, or over one of the flat portions 42a, 42b. Each spacer clip outer tab 53b may be directly secured to the outer shell 55.

Figure 7:
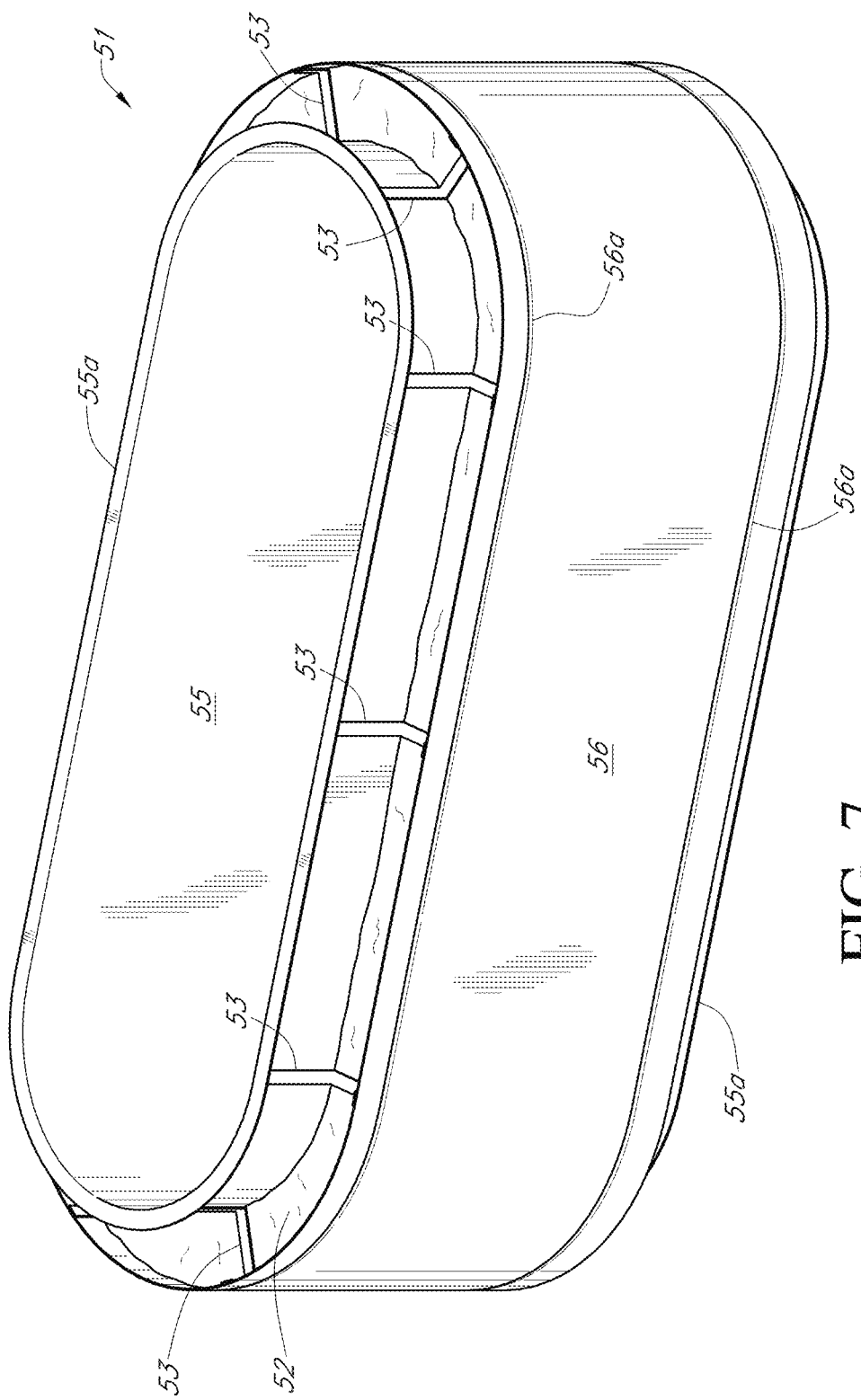
FIG. 7 is a perspective view of one chimney section of the section embodiment.

In an aspect shown in FIG. 7, the outer shell 56 may be formed with an outer shell channel 56a therein on at least one end of the outer shell 56. An outer band 57 may be placed between two adjacent outer shells 55. As shown in FIG. 5, the outer band 57 may be configured so that each end of the outer band 57 may seat within the outer shell channel 56a in two adjacent outer shells 56, respectively.

To facilitate access to the inner shells 55 during assembly or for maintenance, adjacent outer shells 56 may be formed with a significant space therebetween, as shown in FIG. 5. As described above, an outer band 57 may be placed between two adjacent outer shells 55 to seal the space between the two outer shells 55. The amount of space between adjacent outer shells 55 (and consequently the dimensions of the outer band 57) will vary depending on the specific application of the insulated chimney system 50, and is therefore in no way limiting to the scope of the present disclosure unless so indicated in the following claims. The inner and outer shells 55, 56 may be connected via one or more spacer clips 53 prior to installation of the insulated chimney system 50, and insulation 52 may be placed between the inner and outer shells 55, 56, allowing corresponding inner and outer shells 55, 56 to be installed as one unit, referred to herein as an insulated chimney section 51. As is apparent to those skilled in the art in light of the present disclosure, both the chimney system 10 and the insulated chimney system 50 of the present disclosure may allow for tension to be applied to either the V-band 40 and/or the outer band 57 in a direction perpendicular to the longitudinal axis of the chimney system 10 or insulated chimney system 50.

In one aspect of the chimney system 10, the first section 20 and second section 30 may both be comprised of twenty gauge 304 stainless steel. In one aspect of the insulated chimney system 50 the inner shell 55 may be comprised of twenty gauge 304 stainless steel. Typically, an insulation layer may be applied. The longitudinal seams for any section 20, 30 of the chimney system 10, or any inner shell 55 or outer shell 56 of the insulated chimney system 50 may be continuously welded to reduce corrosion and ensure a pressure-tight seal at each seam. Those of ordinary skill in the art will appreciate that other structures and/or methods of manufacture are possible, without limitation unless so indicated in the following claims.

The sections 20, 30, V-band 40, V-band clamp 48, spacer clip 53, inner shell 55, and outer shell 56 may be made from twenty gauge 304 stainless steel, higher or lower chrome steels, or any other material known to those skilled in the art or later developed that is suitable for the application. However, the material chosen in no way limits the scope of the present disclosure unless so indicated in the following claims, and it is contemplated that such specifications may vary based on the particular application for which the chimney system 10 or insulated chimney system 50 is used.

As shown in the end view of a section 20, 30 in FIG. 4, in an aspect the cross-sectional shape of each section 20, 30 may be obround. However, the chimney system 10 or insulated chimney system 50 may be configured with sections 20, 30 having cross-sectional shapes of infinite variety as long as the cross-sectional shape is rounded but non-circular. Accordingly, the shape chosen in no way limits the scope of the present invention unless so indicated in the following claims, and it contemplated that such specifications may vary based on the particular application for which the chimney system 10 or insulated chimney system 50 is used.

To better understand the chimney system 10 and insulated chimney system 50, one method of manufacture for a section 20, 30 as pictured and previously described herein will now be described in detail. Those skilled in the art will appreciate that a number of ways to manufacture a section 20, 30 for the chimney system 10 exist, and the specific method used in no way limits the scope of the chimney system 10, sections 20, 30, insulated chimney system 50, or insulated chimney sections 51 unless so indicated in the following claims. Accordingly, the method that follows is but one way to manufacture a chimney section 20, 30.

A piece of material, such as stainless steel, may be first cut to the dimensions required to form a sheet 60, which is shown in FIG. 8. Typically, the sheet 60 is rectangular in shape, but it may be other shapes as well. The precise dimensions of the sheet 60 will be dependent on the design specifications for the chimney system 10 or insulated chimney system 50. The sheet 60 is positioned in a metal brake (not shown) and four creases 62 are formed therein. The four creases 62 serve to divide the sheet into five sections. The five sections include two outer sections 64, two inner sections 66, and one middle section 68. One outer section 64 is adjacent the sheet right edge 61a and the other outer section 64 is adjacent the sheet left edge 61b. The middle section 68 is in the geometric center of the sheet 60, and an inner section 66 is positioned on either side thereof. The two outer sections 64 are identical with one another in size and shape, and the two inner sections 66 are identical with one another in size and shape. Accordingly, the creases 62 are symmetrical about both axes of the sheet.

The sheet 60 is then placed on a metal forming roll (not shown). Each outer section 64 is then formed into a quarter-circle shape. Next, the middle section 68 is formed into a half-circle shape. After this step, the sheet right edge 61a and sheet left edge 61b are in close proximity to one another so that they may be welded together. The resulting seam runs in an axial direction along the entire length of the section 20, 30. In an aspect, the two outer sections 64 cooperate to form one rounded side of the section 20, 30 and the middle section 68 forms the other rounded side. The two inner sections 66 comprises the straight sides of the section 20, 30.

A rigid jig may then be placed around the outer periphery of the section 20, 30 so that the cross-sectional shape of the section 20, 30 is maintained throughout the remainder of the fabrication process. The section 20, 30 may be positioned on a roll forming machine (not shown) set to form a flange 24, 34 of the desired dimensions at one end of the section 20, 30. If a second flange 24, 34 is desired on the other end of the section 20, 30, the jig may be transferred adjacent that end and a flange 24, 34 may be formed thereon using the roll forming machine (not shown). To ensure that the section 20, 30 remains symmetrical along the longitudinal axis thereof throughout the fabrication process, the rotation of the roll forming machine (not shown) may be reversed during the formation of the second flange 24, 34. That is, if the first flange 24, 34 is formed by rotating the section 20, 30 clockwise in the roll forming machine (not shown), the second flange 24, 34 may be formed by rotating the section 20, 30 counter-clockwise in the roll forming machine (not shown).

The outer shell 56 for an insulated chimney section 51 may be fabricated in substantially the same manner. However, instead of forming a flange 24, 34 on the roll forming machine (not shown), a different die may be used that forms an outer shell channel 56a. As with the fabrication of the section 20, 30, if the outer shell 56a is fabricated with an outer shell channel 56a on each end thereof, the direction of rotation of the outer shell 56 during formation of the first outer shell channel 56a may be opposite of the direction of rotation of the outer shell 56 during formation of the second outer shell channel 56a.

Sections 20, 30 (i.e., inner shells 55 when used in an insulated chimney system 50) may be joined with corresponding outer shells 56 through the use of spacer clips 53, many methods of which are well known to those skilled in the art and will therefore not be described in further detail herein. Insulation 52 may also be placed between the inner shell 55 and outer shell 56 so that each insulated chimney section 50 is ready to install before it is exposed to the elements.

It is contemplated that machines other than those described for use in the above method may be used to fabricate sections 20, 30, inner shells 55, outer shells 56, or insulated chimney sections 51. Accordingly, the specific machine used to fabricate any element of the chimney system 10 or insulated chimney system 50 in no way limits the scope of the present disclosure unless so indicated in the following claims.

Detailed Description of a Joint Seal System & Method

Figure 9A:
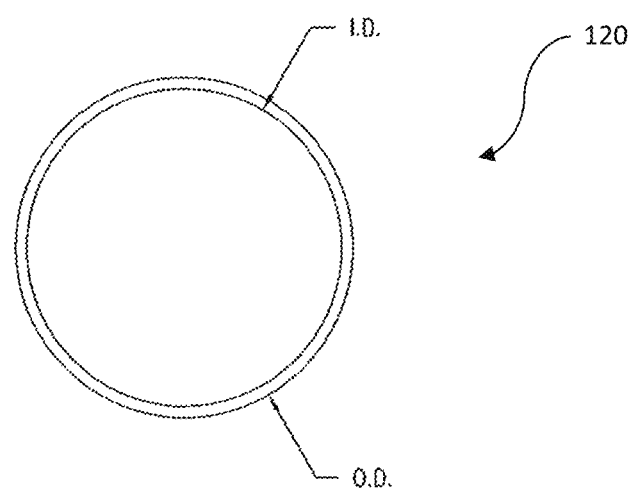
FIG. 9A provides a top view of various aspects of a seal that may be used with a joint seal system & method.
Figure 9B:
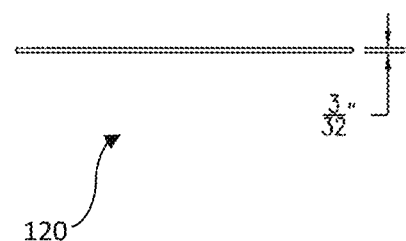
FIG. 9B provides a side view of the seal from FIG. 9A.

Various aspects of a seal 120 are shown in FIG. 9, which may comprise a portion of a joint seal system & method. Various aspects of a band 110 that may be employed with a seal 120 are shown in FIG. 10, which together with a seal 120 may comprise a joint seal system & method. In both FIGS. 9 & 10 various dimensions and/or relative shapes of certain aspects of the band 110 and seal 120 are shown. Such dimensions and/or relative shapes are for illustrative purposes only, and in no way limit the scope of the joint seal system & method unless so indicated in the following claims.

It is contemplated that in an aspect, a joint seal system & method according to the present disclosure may be especially useful when employed with a high-efficiency, commercial boiler vent, wherein a joint seal system & method may be configured to hold pressure in a fluid conduit in order to mitigate and/or eliminate leakage of condensate, flue gasses, and/or other fluid, vapor, and/or gas from a joint between two duct sections (e.g., a flange interface 36) and/or between two sections 20, 30 of a chimney system 10 and/or insulated chimney system 50. Accordingly, it is contemplated that certain aspects of a joint seal system & method may be especially useful at a flange interface 36 of two sections 20, 30 (either insulated or not) having flanges 24, 34, such as those shown in FIGS. 1-7.

In an aspect, the joint seal system & method may be configured for use with any gas fired appliance listed as Category II, III, or IV or that call for an AL 29-4C vent. Generally, when describing the joint seal system & method below, any section 20, 30 and/or flange 24, 34 may refer to an uninsulated section 20, 30 or any insulated section 51 without limitation unless so indicated. It is contemplated that the joint seal system & method, in conjunction with one or more sections 20, 30, may be installed as a complete system connecting a device (e.g., an appliance) to the outdoors while operating under positive forced draft, negative induced draft, or neutral gravity flow internal pressuring conditions. In applications in which a drain fitting may be required, it is contemplated that it may be advantageous to locate the drain fitting as close to the flue outlet as is possible, but other locations may be used without limitation unless so indicated in the following claims. Installation instructions and an operation and maintenance manual illustrating various aspects of a joint seal system & method is attached hereto and made a part hereof as Appendix A.

Figure 10A:
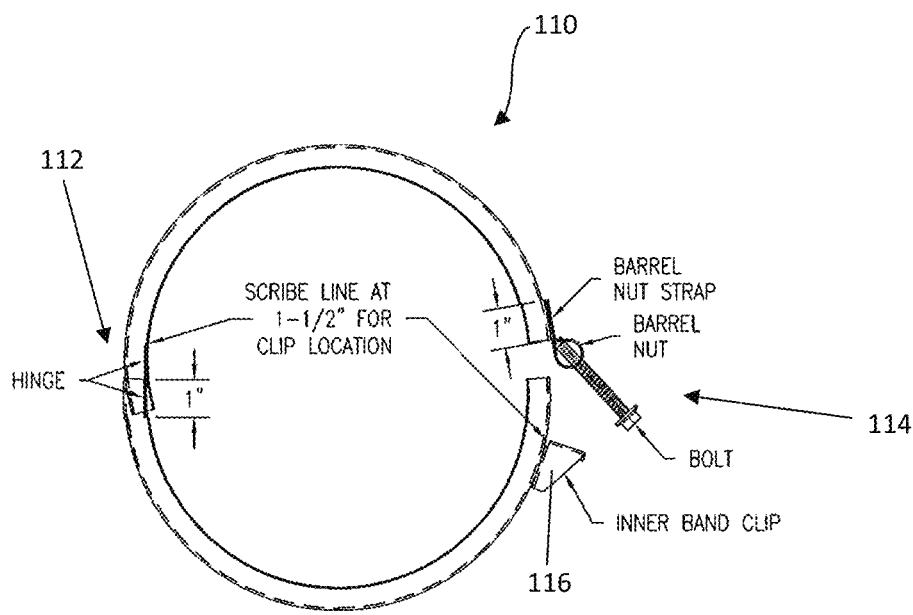
FIG. 10A provides a top view of a band that may be used with a joint seal system & method.
Figure 10B:
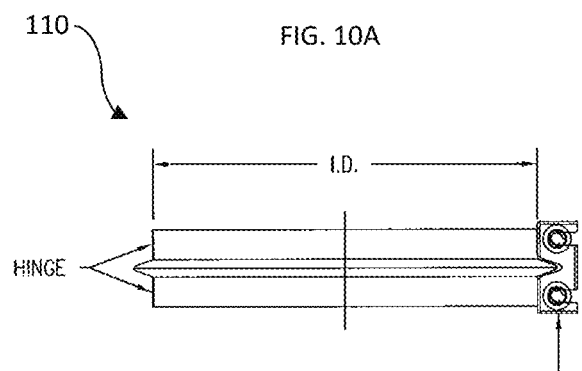
FIG. 10B provides a side view of the band shown in FIG. 10A.
Figure 10C:
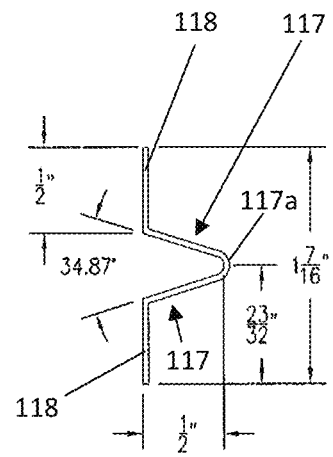
FIG. 10C provides a cross-sectional view of the band shown in FIGS. 10A & 10B.

Referring now to FIGS. 10A-10C, a band 110 may generally be configured as a ring and comprising a hinge 112, which hinge 112 may be opposite two open ends of the band 110. In an aspect, a connector 114 may be engaged with a first open end and an anchor 116 engaged with a second open end as further described in detail below. In other aspects, a band 110 may be differently shaped without limitation unless so indicated in the following claims. For example, in an aspect a band 110 may have an obround shape for use with a section 20, 30 such as that shown in FIGS. 1-7. A connector 114 may be formed as a bolt that is configured to engage an anchor 116 at the two free ends of the band 110, respectively. In this manner, the band 110 may be configured to allow relatively easy engagement and disengagement with one or more sections 20, 30 at a flange interface 36. Other connectors 114 may be used with a joint seal system & method without limitation unless so indicated in the following claims, and the optimal structure and/or method for a connector 114 will vary from one application of the joint seal method & system to the next.

The band 110 may be configured with two angled portions 117 extending from a vertex 117a to form a V-shape in cross section. At the end of each angled portion 117 opposite the vertex 117a, a flat portion 118 may extend away from a line bisecting the two angled portions 117. In an aspect, the cross-sectional shape of the band 110 may be symmetrical, as shown in FIG. 10A or FIG. 10C. In certain applications, it is contemplated that it may be advantageous to configure the band 110 such that each flat portion 118 is between 0.25 and 1.0 inches, with an especially advantageous dimension of 0.5 inches. Additionally, it is contemplated that for certain applications it may be advantageous to configure the band 110 such that the linear dimension from the vertex 117a to each flat portion 118 is between 0.25 and 1.0 inches, with an especially advantageous dimension of 0.5 inches. Finally, it is also contemplated that for certain applications it may be advantageous to configure the vertex 117a and two angled portions 117 such that the angle between the two angled portions is between 60 and 80 degrees, with an especially advantageous angle of 70 degrees. Accordingly, the overall distance between the distal end of one flat portion 118 and that of the other flat portion 118 may be between 1.0 and 2.25 inches, with an especially advantageous distance of about 1 and $7/16^{th}$ inches. In one aspect, it is contemplated that the band 110 may be constructed for 22 gauge metallic material, and may further be constructed of 304, 316, or 316L stainless steel. However, other suitable material and/or other relative dimensions, configurations, etc. of the various elements may be used without limitation unless so indicated in the following claims.

Figure 12A:
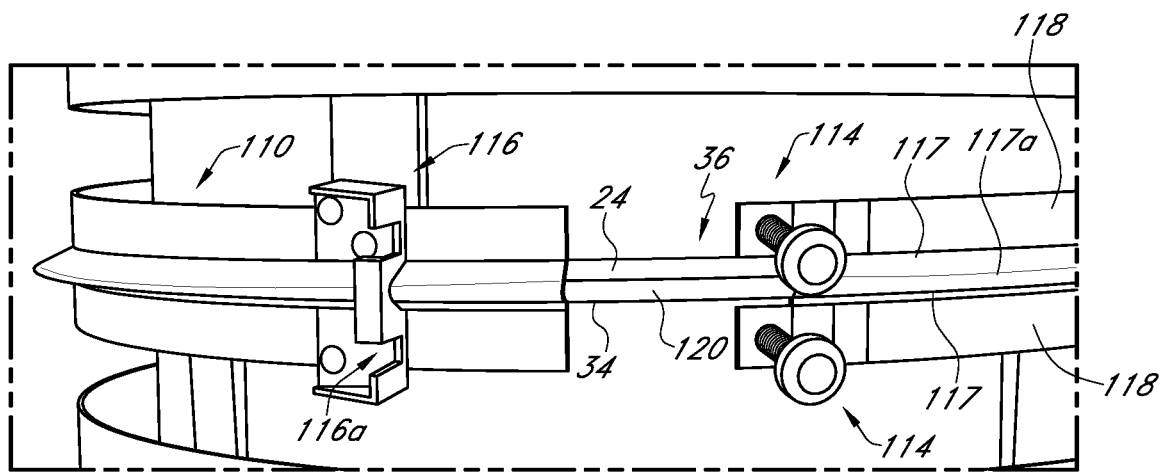
FIG. 12A provides a perspective view of a flange interface with a seal positioned between the two flanges and a band positioned over the flange interface.

Referring now to FIG. 12A, which provides a detailed perspective view of various aspects of a joint seal system & method, it is contemplated that in one application, all or a portion of the flanges 24, 34 at a flange interface 36 of two sections 20, 30 may be positioned within the angled portion 117, and the flat portions 118 may extend around a portion of the exterior surface of either section 20, 30 adjacent the flanges 24, 34, and the seal 120, flanges 24, 34, and band 110 may cooperate to form a hermetic or nearly hermetic seal capable of preventing pressure leakage, flue gas leakage, and/or condensate leakage at pressure differentials up to 1.5 ATMs from ambient pressure (either positive or negative) as described in further detail below.

Figure 11:
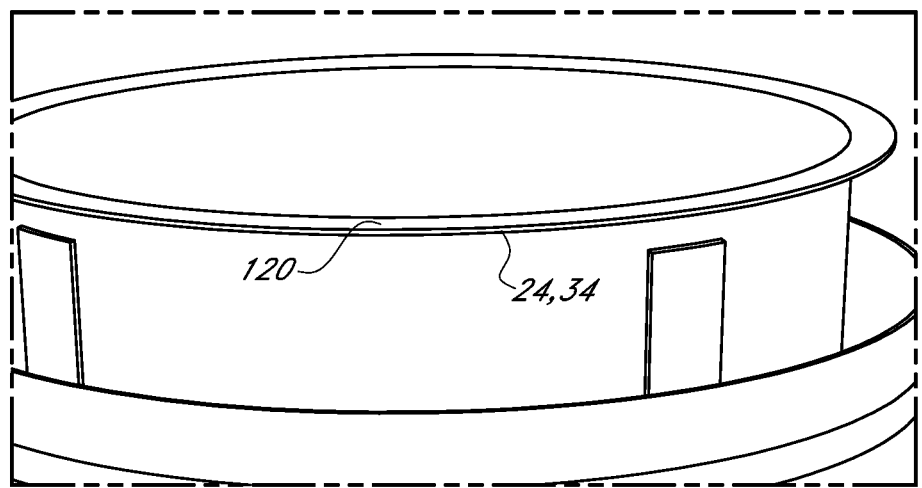
FIG. 11 provides a perspective view showing various aspects of a seal positioned on a flange.

In an aspect, a seal 120 may be positioned at the flange interface 36 of two sections 20, 30. Still referring to FIG. 12A, two adjacent flanges 24, 34 may have at least one seal 120 positioned therebetween at a flange interface 36. The seal 120 may abut each flange 24, 34 of the two adjacent sections 20, 30. As depicted in FIG. 12A, the band 110 is not yet tightened around the flange interface 36, and the connector(s) 114 are not yet engaged with the anchor 116, the process of which is described in further detail below. Such a configuration may dispense with the need to use a sealant between the flanges 24, 34, and/or allow for a hermetic seal between the flanges 24, 34, thereby mitigating and/or eliminating the pressure, flue gas, and/or condensate leakage at the flange interface 36, deficiencies in which are common to designs found in the prior art. In an aspect, the seal 120 may be between $\frac{1}{32}$ and $\frac{5}{32}$ of an inch thick, and the difference between the outer diameter and inner diameter may be between 0.5 and 1.5 inches without limitation unless so indicated in the following claims. It has been found that Aero Rubber Company and Sur-Seal manufacture seals 120 that may be suitable for certain applications. A seal 120 positioned on a single flange 24, 34 is shown in perspective in FIG. 11.

It is to be understood that the connector 114 and/or anchor 116 may be configured such that the tension of the band 110 (and in some aspects, consequently the amount by which the seal 120 is compressed) may be adjustable, such that as the band 110 is tightened, the force the band 110 exerts on the abutting flanges 24, 34 increases in at least one dimension, and in two dimensions for certain configurations, wherein a first dimension generally may be normal to the flanges 24, 34 and a second dimension generally may be parallel to the flanges 24, 34. It is contemplated that in some applications, as a force in the first dimension increases, the two flanges 24, 34 may be urged toward one another, which may reduce the propensity for pressure, flue gas, and/or condensate to pass through a flange interface 36.

Referring again to FIG. 12A, in one aspect a band 110 may be configured with two connectors 114, wherein each connector 114 may be positioned on either flat portion 118 to engage a corresponding portion of the anchor 116. In an aspect, each connector 114 may be configured as a barrel bolt, wherein one end thereof may be pivotally engaged with a respective flat portion 118 of the band 110. The barrel bolt may be pivoted toward the anchor 116 such that a threaded portion of the barrel bolt is positioned within a slot 116a formed in the anchor 116, and a nut (which may be positioned on the side of the slot 116a in the anchor 116 opposite the connector 114) may be tightened along the barrel bolt, thereby reducing the distance between the connector 114 and the anchor 116. However, other configurations of anchors 116 and/or connectors 114 may be employed with the joint seal system & method without limitation unless so indicated in the following claims.

It is further contemplated that certain seals 120 may have an optimal amount of deformation to achieve the best seal between two flanges 24, 34, which optimal amount of deformation may depend at least upon the material used to construct the seal 120. The seal 120 may be constructed of any suitable material for the particular application thereof, including but not limited to synthetic materials, cellulosic materials, natural materials, and/or combinations thereof without limitation unless so indicated in the following claims. Furthermore, in certain applications, a seal 120 may be employed in conjunction with another sealant material, such as a liquid, paste, epoxy, and/or other sealant material.

Figure 12B:
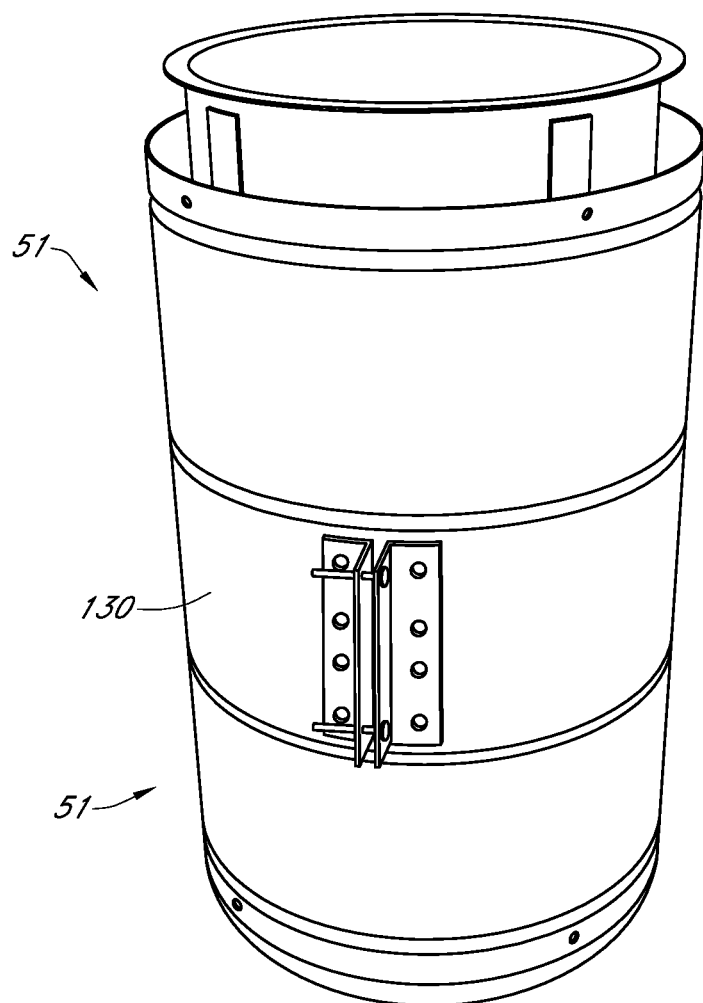
FIG. 12B provides a perspective view of the flange interface shown in FIG. 12A with an exterior band positioned over the flange interface and band.

In an aspect, the joint seal system & method may be used with an insulated chimney system 50. In such a configuration, a separate exterior band 130 may be positioned around the flange interface 36 and the entire band 110, one example of which is shown in FIG. 12B. Without limitation unless so indicated in the following claims, additional insulative material may be positioned between the external surface of the joint seal system & method (e.g., the area adjacent the band 110 in FIG. 12A) and the interior surface of the exterior band 130 to achieve higher thermal efficiency, better mitigation of leaks, or for any other reason suitable for the specific application.

Figure 13:
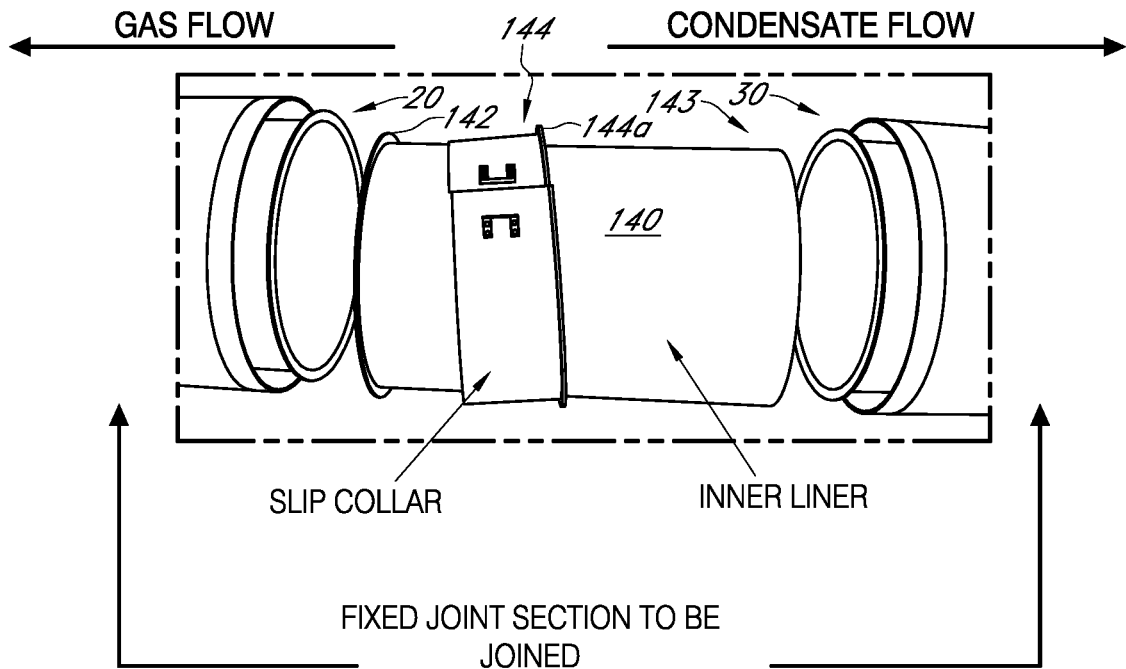
FIG. 13 provides a perspective view of an intermediate section with a slip collar positioned between two fixed sections.
Figure 14:
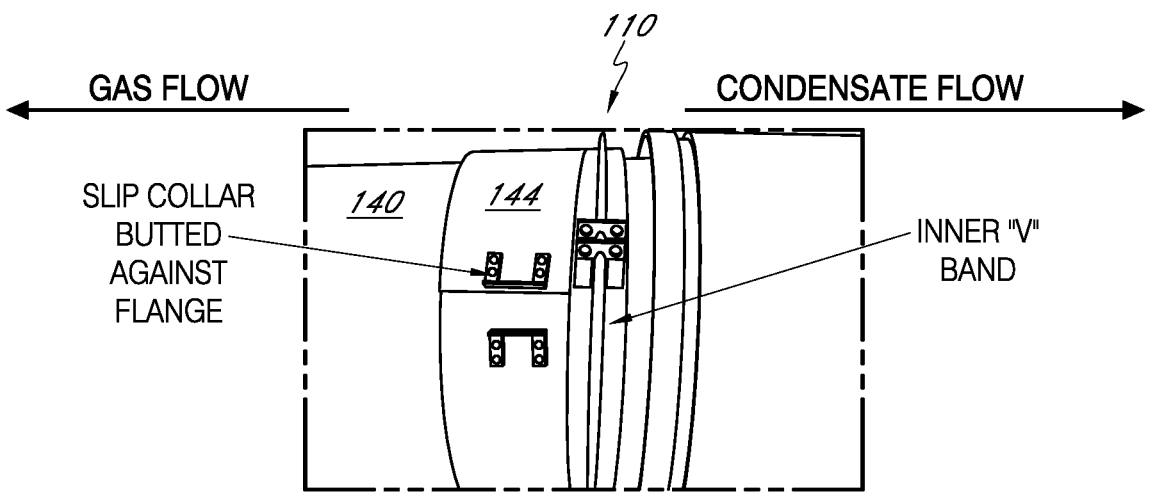
FIG. 14 provides a perspective view of the intermediate section and fixed sections from FIG. 13 wherein each fixed section is abutting the intermediate section.

Referring now to FIGS. 13 & 14, the joint seal system & method may be configured to adapt for variable distances between two fixed sections 20, 30. As shown in FIG. 13, an intermediate section 140 may have a slip collar 144 positioned over a portion of the intermediate section 140. The slip collar 144 may be moveable along a length of the intermediate section 140, and one end of the intermediate section 144 may be formed with a fixed flange 142 opposite a free end 143 of the intermediate section 140. The slip collar 144 may be configured with a slip collar flange 144a of similar utility and/or dimensions to other flanges 24, 34 described and disclosed herein.

Generally, it is contemplated that the fixed flange 142 may be engaged with a flange 24, 34 of a section 20, 30 that is downstream (with respect to an appliance) and that the slip collar flange 144a may be engaged with a flange 24, 34 positioned on a fluid conduit that is engaged with an appliance. Accordingly, gas and/or vapor flow may proceed in a first direction and condensate may flow in an opposite direction, as shown in FIGS. 13 & 14. The intermediate section 140 may accommodate various lengths between to fixed sections 20, 30 by allowing adjustability of the distance by which the free end 143 is inserted one of the fixed sections 20, 30.

As depicted in FIG. 14, after the free end 143 is inserted into a first fixed section 20 by the desired amount, the fixed flange 142 of the intermediate section 140 may be engaged with the second section flange 34, and a band 110 may be secured over that flange interface 36 to secure the relative positions of the second section 30 and intermediate section 140. Next, the slip collar 144 may be moved along the length of the intermediate section 140 toward the first section 20 until the slip collar flange 144a abuts the first section flange 24. A band 110 may then be positioned over the flange interface 36 of the slip collar flange 144a and the first section flange 24 to secure the relative positions of the slip collar 144 and the first section 20.

The slip collar 144 may be formed with an anchor and connector, which anchor and connector may be configured in a manner similar to that previously described for the band 110. Generally, the anchor and connector for the slip collar 144 may serve to selectively secure the position of the slip collar 144 with respect to the intermediate section 140. Accordingly, any suitable structure and/or method may be used to selectively secure the position of the slip collar 144 at specific position on the intermediate section without limitation unless so indicated in the following claims.

Further Embodiments of a Joint Assembly

Figure 15A:
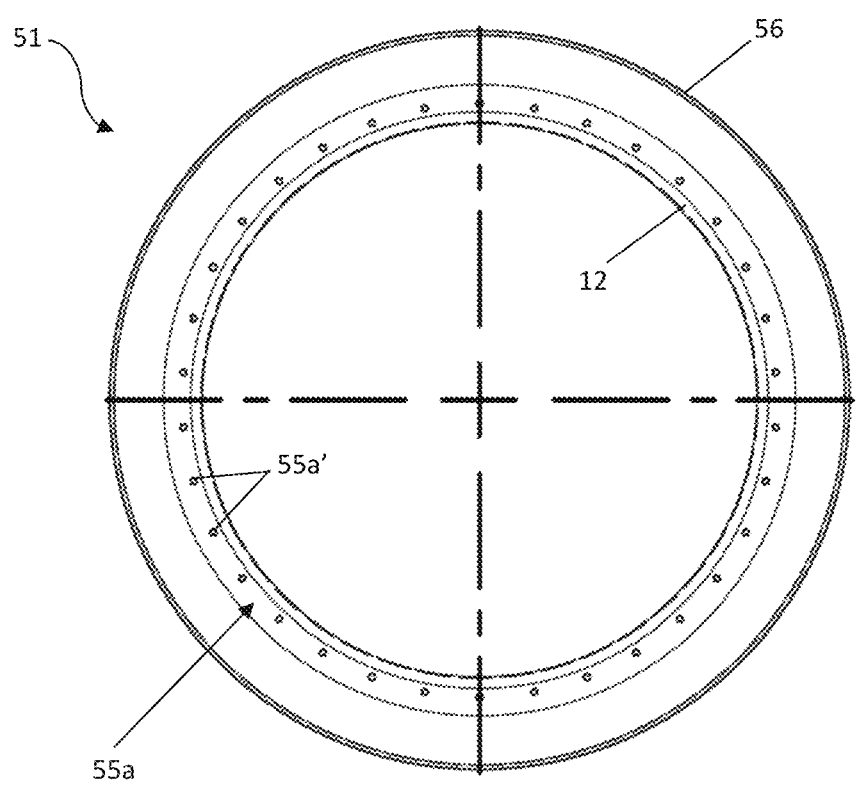
FIG. 15A provides an end view of an insulated chimney section.
Figure 15B:
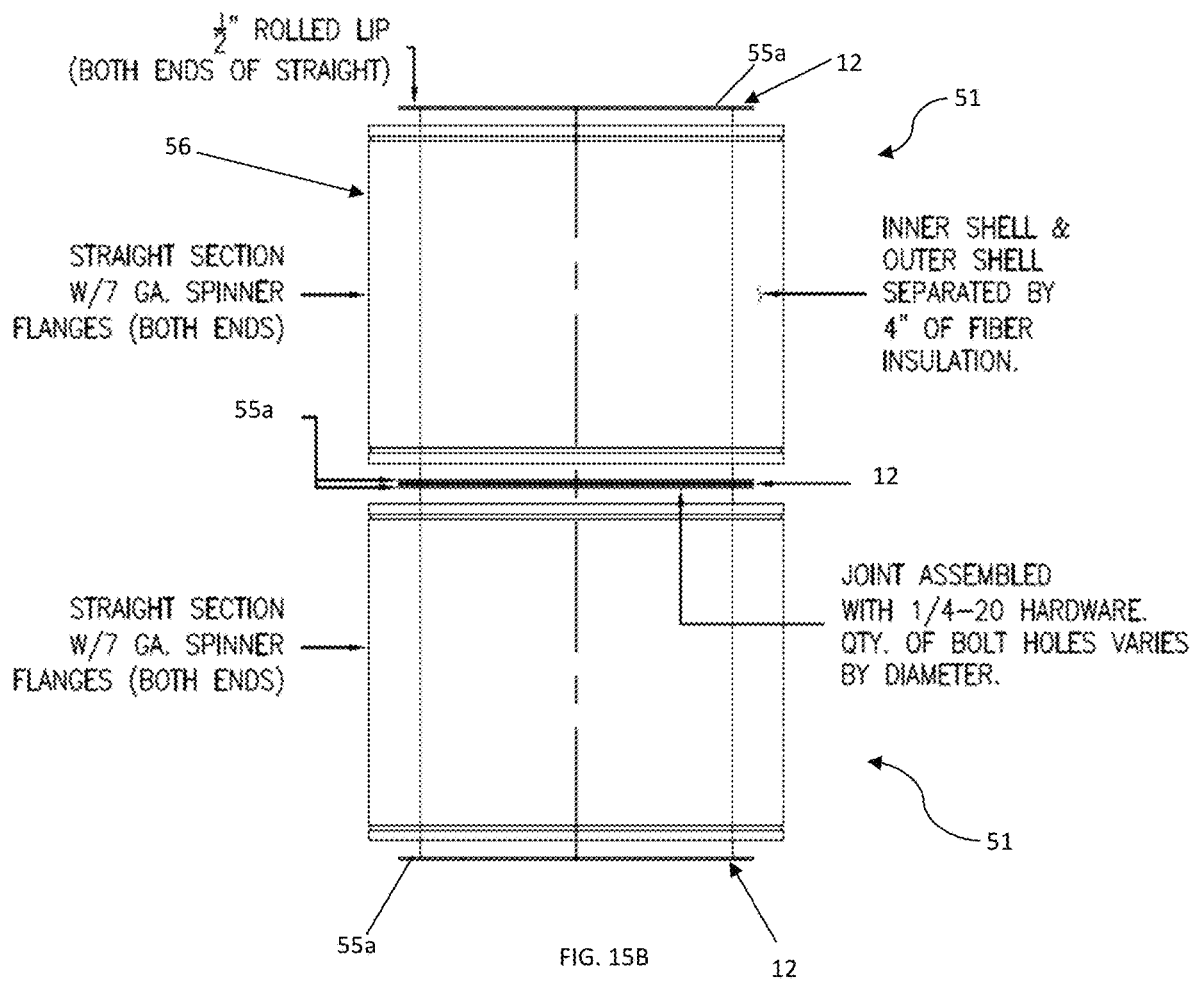
FIG. 15B provides a side view to insulated chimney sections from FIG. 15A engaged with one another.

Another chimney section 51 and joint seal system and method for two adjacent chimney sections 51 configured according to the present disclosure is shown in FIGS. 15A & 15B. Generally, this joint seal system and method may be configured to provide a high-performing seal (e.g., very minimal to no detectable fluid leaks) in a high-temperature application, such as an engine generator exhaust system, wherein the joint assembly may be used in joints on a chimney system for venting engine generator exhaust. In such an application the joint seal system and method may be configured to perform suitably in temperatures as low as −50° F. to temperatures as high as 1200° F. without limitation unless so indicated in the following claims. Currently, the only design that achieves such a level of performance is welded joints or UL-listed, prefabricated joints. However, for both of those prior art solutions leakage is allowed, making the joint seal system and method described and disclosed herein superior.

The chimney section 51 shown in FIGS. 15A & 15B may be configured as a double-wall prefabricated section with between 2 and 6 inches of insulation between the inner diameter and the outer diameter. However, other amounts of insulation may be used without limitation unless so indicated in the following claims, and the optimal amount of insulation may vary from one application to the next. For example, it has been found that for one application, 4 inches of insulation may be optimal, while for a second application 5 inches of insulation may be optimal. For still another application, six inches of insulation may be optimal. Each chimney section 51 may be configured with an inner flange 55a that may be configured as a ½-inch roll lip, but which may be differently configured in other embodiments without limitation unless so indicated in the following claims. At least the outer shell 56 of a chimney section 51 and inner flange 55a may be produced using 7-gauge metallic material (such as aluminum, steel, stainless steel, etc.), but the scope of the present disclosure is not so limited and other materials, thicknesses, etc. may be used unless otherwise indicated in the following claims.

Multiple chimney sections 51 may be engaged with adjacent chimney sections 51 to form a modular, prefabricated system that may be configured to have relatively high heat resistance and simultaneously high positive or negative pressures (e.g., in applications ranging from 0.5 psi to 4 psi positive or negative gauge pressures without limitation unless so indicated in the following claims) sealing/leak mitigation capabilities. In one aspect such a system may be used as a vent for generator exhaust. However, other applications of the system exist without limitation unless so indicated in the following claims. The modular system may be comprised of one or more chimney sections 51 configured in sizes and shapes that are relatively lightweight and easy-to-handle lengths. For example, it is contemplated that for some applications it may be advantageous to configure a chimney section 51 with a length of between 8 inches and 70 inches, an inner diameter of between 4 inches and 54 inches, and having a weight of between 20 to 350 pounds. However, the specific physical dimensions, shape, weight, etc. of each chimney section 51 in no way limits the scope of the present disclosure unless so indicated in the following claims.

The joint seal system and method may be configured for use between two adjacent chimney sections 51 and may be further configured with a high temperature and pressure-tight gasket 12 between adjacent inner flanges 55a of two separate chimney sections, and a plurality of mechanical fasteners may be used to engage two adjacent inner flanges 55a. The gasket 12 may be comprised of graphite but is not so limited unless indicated in the following claims.

Additionally, in one embodiment adjacent inner flanges 55a of two chimney sections 51 may each have a high-temperature gasket 12 pre-installed on the associated inner flange 55a, such that the abutting inner flanges 55a form a gasket-to-gasket seal utilizing two gaskets 12 immediately adjacent one another. It is contemplated that such a gasket-to-gasket seal (as opposed to a traditional seal utilizing only one gasket 12 positioned between two opposing flanges) may mitigate and/or eliminate the likelihood of fluid leaks between the two chimney sections 51. The optimal materials of construction for the gasket 12 may vary from one application of the joint seal system and method to the next, and is therefore in no way limiting to the scope of the of the present disclosure unless otherwise indicated in the following claims. Such materials of construction may include, but are not limited to, rubber materials (e.g., silicon, fluorosilicone, vulcanized rubber, ethylene propylene diene monomer rubber, etc.), carbon-based materials (carbon, fluorocarbon, polytretrafluoroethylene), ceramic fiber materials, and/or combinations thereof.

Any suitable mechanical fastener may be used to engage one chimney section 51 with another, such as bolts with corresponding nuts, screws, rivets, clamps, and/or combinations thereof without limitation unless so indicated in the following claims. and bolt flange. Additionally, the number and size of mechanical fasteners may vary from one application to the next, and in one embodiment the mechanical fasteners may be configured as ¼-inch bolts having a length between 1 and 4 inches and corresponding nuts. Accordingly, the specific apparatus and/or method used to secure adjacent chimney sections 51 to one another in no way limits the scope of the present disclosure unless so indicated in the following claims. Furthermore, a chimney section 51 may be configured as a straight section, expansion joint, tee, elbow, angled member, support devices, etc. without limitation unless so indicated in the following claims, such that a prefabricated system may be configured as a complete exhaust system to be assembled from standard components.

Figure 16:
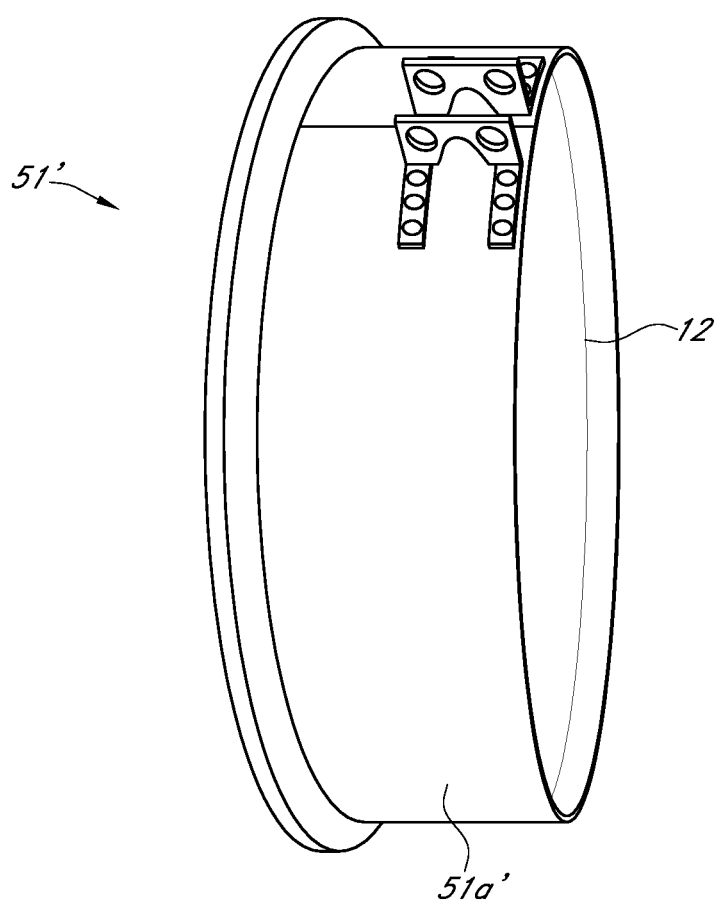
FIG. 16 provides a perspective view of a starter section that may be used with the joint seal system & method.

In another embodiment of a joint seal system & method, a starter section 51', as shown in FIG. 16, may be configured for installation with a raw appliance outlet (not shown). In such an application, a starter section 51' may be formed with a starter section collar 51a'. A gasket 12 may be engaged on an interior surface of the starter section collar 51a' in a manner such as that previously described for the inner flange 55a of a chimney section 51 without limitation unless otherwise indicated in the following claims. The starter section collar 51a' may be positioned on the appliance outlet such that the gasket 12 engages an exterior surface of the appliance outlet. The starter section 51' may be secured to the appliance outlet in any manner as previously described for securing the position of the slip collar 144 as previously described herein without limitation unless otherwise indicated in the following claims. In this way, a starter section 51' may facilitate a leak-free (or nearly leak-free) connection for an appliance outlet to another chimney section 51 utilizing the joint seal system & method, and thereby may provide a high-performing seal (e.g., very minimal to no detectable fluid leaks) in a high-temperature application directly from an appliance outlet.

Having described an illustrative embodiment of a chimney section 51 and joint seal system and method for use in relatively high temperature, positive pressure applications, a method of assembling such a joint seal will now be described in detail. The following method is for illustrative purposes only and in no way limits the scope of the present disclosure unless so indicated in the following claims.

Generally, the chimney sections 51 configured for use with a modular system may be configured with inner flanges 55a that are rotatable with respect to the chimney section 51 such that an apertures 55a' formed therein may be aligned with apertures 55a' in the corresponding inner flange 55a of an adjacent chimney section 51. Furthermore, as described in detail above, the inner flange 55a of each chimney section 51 may be configured such that a gasket 12 is affixed thereto prior to assembly (i.e., a gasket 12 may be pre-installed on an inner flange 55a) such that when two adjacent chimney section 51 abut one another, a gasket-to-gasket seal is formed therebetween.

After the adjacent inner flanges 55a are properly aligned, a high temperature gasket 12 may be positioned therebetween. A final alignment of the apertures 55a' in the adjacent inner flanges 55a and the gasket 12 may then be performed, and mechanical fasteners (bolts and corresponding nuts in the illustrative embodiment) may be positioned in the apertures 55a'. The mechanical fasteners may be intermittently tightened around the inner flanges 55a to approximately 6.25 foot-pounds of torque. However, in other applications the optimal torque of a mechanical fastener may be greater or lesser than that amount without limitation unless so indicated in the following claims. In still other applications, chemical adhesives may be used in place of or in addition to mechanical fasteners without limitation unless so indicated in the following claims.

After all mechanical fasteners have been adequately tightened, an insulation strip may be positioned over the joint (i.e., the area adjacent the two corresponding inner flanges 55a). An outer band, which may be formed as a flat material with a periphery of similar or identical size and shape of that of the chimney section 51, may be positioned over the insulation strip and engage a portion of the outer shell 56 of each adjacent chimney section 51 and may be secured thereto with any suitable method or apparatus including but not limited to mechanical fasteners (bolts, screws, rivets, etc.), chemical adhesives, and/or combinations thereof. It is contemplated that for certain applications (e.g., outdoor applications) it may be advantageous to apply a chemical sealant (e.g., S600 sealant) to all or a portion of each edge of outer band.

The preceding constraints, examples, and configurations in any of the aspects of the present systems & methods disclosed and described herein are for illustrative purposes only, and are in no way limiting to the scope of any of the systems and/or methods as disclosed herein unless so indicated in the following claims. Furthermore, the various solutions, processes, methods, modules, features, aspects, and/or embodiments disclosed or described herein may be implemented in conjunction with one another or independently from one another. Accordingly, the presence or absence of other subject matter that may be complementary to the present systems and/or methods in no way limits the scope of the present systems and/or methods unless so indicated in the following claims.

It should be noted that the present systems and/or methods are not limited to the specific embodiments described herein, but is intended to apply to all similar systems and/or methods for mitigating and/or eliminating leakage between two adjacent duct sections. Modifications and alterations from the described embodiments will occur to those skilled in the art without departure from the spirit and scope of the present systems and/or methods.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit of the present disclosure. Other embodiments will be apparent to those skilled in the art from consideration of the specification and practice disclosed herein. It is intended that the specification and examples be considered as illustrative only, with a true scope and spirit being indicated by the following claims.

The invention claimed is:

1. A method of joining a first duct section and a second duct section which allows for a variable distance therebetween, said method comprising the steps of:
   a) fixing a position of said first duct section, said first duct section comprising:
      i) a body having a circular cross-sectional shape;
      ii) a first flange integrally formed with a first end of said body, wherein said first flange is continuous around a periphery of said first end of said body, wherein said first flange is substantially perpendicular to a main longitudinal axis of said body; and,
      iii) a second flange integrally formed with a second end of said body, wherein said second flange is continuous around a periphery of said second end of said body, and wherein said second flange is substantially perpendicular to said main longitudinal axis of said body;
   b) fixing a position of said second duct section, said second duct section comprising:
      i) a body having a circular cross-sectional shape; and
      ii) a first flange integrally formed with a first end of said body, wherein said first flange is continuous around a periphery of said first end of said body, wherein said first flange is substantially perpendicular to a main longitudinal axis of said body;
   c) positioning an intermediate duct section between said first duct section and said second duct section, said intermediate duct section comprising:
      i) a first end formed with a fixed flange thereon;
      ii) a second end formed as a free end, wherein a cross-sectional shape and a peripheral dimension of said free end is substantially the same as a cross-sectional shape and a peripheral dimension of said first end of said intermediate duct section without said fixed flange; and,
  iii) a slip collar positioned over a portion of an exterior of said intermediate duct section between said first and second ends, wherein said slip collar may move along a length of said intermediate section, wherein said slip collar is formed with a slip collar flange thereon, wherein said slip collar is formed with an anchor and a connector, and wherein said anchor and said connector are configured to allow a user to selectively secure a position of said slip collar with respect to said first and second ends of said intermediate duct section;
d) inserting said free end of said intermediate duct section into said first duct section such that said free end extends into said first duct section beyond said first flange of said first duct section;
e) positioning a first gasket between said fixed flange of said intermediate duct section and said first flange of said second duct section;
f) positioning said fixed flange of said intermediate duct section adjacent said first flange of said second duct section;
g) securing said fixed flange of said intermediate duct section to said first flange of said second duct section;
h) positioning a second gasket between said slip collar flange and said first flange of said first duct section;
i) moving said slip collar toward said first flange of said first duct section until said slip collar flange is adjacent said first flange of said first duct section;
j) securing said slip collar flange of said intermediate duct section to said first flange of said first duct section; and
k) sealing a space between said slip collar and an exterior surface of said intermediate duct section.

2. The method according to claim 1 wherein said first duct section further comprises:
  a) an outer shell comprising:
    i) a body, wherein a cross-sectional shape of said outer shell body is circular, and wherein a periphery of said outer shell body is greater than that of said body of said first duct section; and
    ii) an outer shell channel, wherein said outer shell channel is integrally formed with said body;
  b) a plurality of spacer clips, wherein each spacer clip extends from said first duct section body to said outer shell; and,
  c) an insulating material, wherein said insulating material is positioned between said first duct section body and said outer shell.

3. The method according to claim 1 wherein securing said fixed flange of said intermediate duct section to said first flange of said second duct section comprises:
  g-i) positioning a first band around a flange interface formed between said fixed flange of said intermediate duct section adjacent said first flange of said second duct section; and
  g-ii) tightening said first band such that it engages said fixed flange of said intermediate duct section adjacent said first flange of said second duct section to secure a relative position between said intermediate duct section and said second duct section.

4. The method according to claim 3 wherein said first band is further defined as comprising:
  a) a hinge;
  b) a first open end;
  c) a second open end;
  d) a connector engaged with said first open end;
  e) an anchor engaged with said second open end;
  f) a vertex;
  g) a first angled portion extending outward from said vertex;
  h) a second angled portion extending outward from said vertex;
  i) a first flat portion extending away from a distal end of said first angled portion in a direction away from said vertex; and,
  j) a second flat portion extending away from a distal end of said second angled portion in a direction away from said vertex.

5. The method according to claim 3 wherein said step of positioning said fixed flange of said intermediate duct section adjacent said first flange of said second duct section is further defined as compressing said first gasket to create a seal therebetween.

6. The method according to claim 3 wherein securing said slip collar flange of said intermediate duct section to said first flange of said first duct section comprises:
  j-i) positioning a second band around a flange interface formed between said slip collar flange of said intermediate duct section adjacent said first flange of said first duct section; and,
  j-ii) tightening said second band such that it engages said slip collar flange of said intermediate duct section adjacent said first flange of said first duct section to secure a relative position between said intermediate duct section and said first duct section.

7. The method according to claim 6 wherein said second band is further defined as comprising:
  a) a hinge;
  b) a first open end;
  c) a second open end;
  d) a connector engaged with said first open end;
  e) an anchor engaged with said second open end;
  f) a vertex;
  g) a first angled portion extending outward from said vertex;
  h) a second angled portion extending outward from said vertex;
  i) a first flat portion extending away from a distal end of said first angled portion in a direction away from said vertex; and,
  j) a second flat portion extending away from a distal end of said second angled portion in a direction away from said vertex.

8. The method according to claim 6 wherein said step of moving said slip collar toward said first flange of said first duct section until said slip collar flange is adjacent said first flange of said first duct section is further defined as compressing said second gasket to create a seal therebetween.

* * * * *

UNITED STATES PATENT AND TRADEMARK OFFICE
CERTIFICATE OF CORRECTION

| | |
|---|---|
| PATENT NO. | : 11,255,541 B2 |
| APPLICATION NO. | : 16/268228 |
| DATED | : February 22, 2022 |
| INVENTOR(S) | : Zogg et al. |

It is certified that error appears in the above-identified patent and that said Letters Patent is hereby corrected as shown below:

On the Title Page

Item (72) the residential city for inventor Bradley Zogg "Bettendorf, IA (US)" should read – Blue Grass, IA (US) –.

Signed and Sealed this
Second Day of August, 2022

Katherine Kelly Vidal
*Director of the United States Patent and Trademark Office*